US011312055B2

(12) United States Patent
Cisneros et al.

(10) Patent No.: US 11,312,055 B2
(45) Date of Patent: Apr. 26, 2022

(54) METHOD OF ADJUSTING A CROSSHEAD EXTRUDER DIE RETAINING ASSEMBLY

(71) Applicants: Homar Cisneros, Lincoln, NE (US); Douglas R. Ausmus, Newberg, OR (US)

(72) Inventors: Homar Cisneros, Lincoln, NE (US); Douglas R. Ausmus, Newberg, OR (US)

( * ) Notice: Subject to any disclaimer, the term of this patent is extended or adjusted under 35 U.S.C. 154(b) by 346 days.

(21) Appl. No.: 16/148,101

(22) Filed: Oct. 1, 2018

(65) Prior Publication Data
US 2020/0101653 A1 Apr. 2, 2020

(51) Int. Cl.
*B29C 48/30* (2019.01)
*B29C 48/325* (2019.01)
*B29C 48/34* (2019.01)
*B29C 48/154* (2019.01)

(52) U.S. Cl.
CPC .......... *B29C 48/302* (2019.02); *B29C 48/154* (2019.02); *B29C 48/30* (2019.02); *B29C 48/325* (2019.02); *B29C 48/327* (2019.02); *B29C 48/34* (2019.02)

(58) Field of Classification Search
CPC ... B29C 48/154; B29C 48/327; B29C 48/325; B29C 48/34
See application file for complete search history.

(56) References Cited

U.S. PATENT DOCUMENTS

| 3,445,890 A | 5/1969 | Heston |
| 3,477,099 A | 11/1969 | Lee et al. |
| 3,546,743 A | 12/1970 | Roth |
| 3,587,281 A | 6/1971 | Lemelson |

(Continued)

FOREIGN PATENT DOCUMENTS

| CN | 202826334 U | 3/2013 |
| CN | 204076766 | 1/2015 |

(Continued)

OTHER PUBLICATIONS

Gander, et al., Review of Die Lip Buildup in Plastics Extrusion, Apr. 8, 2004, Wiley Online Library.

(Continued)

*Primary Examiner* — Niki Bakhtiari
*Assistant Examiner* — Nicholas J Chidiac
(74) *Attorney, Agent, or Firm* — Timothy E. Siegel Patent Law, PLLC; Timothy E. Siegel

(57) ABSTRACT

An extruder having an extruder crosshead, a die, and a die retaining assembly. The extruder crosshead has an annular major surface while the die has a first die surface facing and conformal to that major surface. The die also has a second die surface opposed to the first die surface. The die-retaining assembly is attached to the extruder crosshead, evenly and variably pressing the second die surface with controlled pressure such that the substantially opposing first die surface is pressed into the major surface of the extruder crosshead. The die-retaining also includes movable elements which abut the die in order to move the die. The die-retaining assembly can be used to evenly reduce the pressure exerted by over the second die surface so that the position adjustment elements can be used to more easily adjust the position of the die.

11 Claims, 7 Drawing Sheets

(56) References Cited

U.S. PATENT DOCUMENTS

| | | | |
|---|---|---|---|
| 3,702,751 A * | 11/1972 | Mehnert | B29C 48/09 425/190 |
| 3,752,614 A | 8/1973 | Bremer | |
| 3,829,274 A | 8/1974 | Melead | |
| 4,280,801 A * | 7/1981 | Wheeler, Jr | B29C 48/3363 425/113 |
| 4,621,996 A | 11/1986 | Hundley, III | |
| 4,838,777 A | 6/1989 | Weber | |
| 5,096,406 A | 3/1992 | Brooks et al. | |
| 5,286,183 A | 2/1994 | Tonsi | |
| 5,690,971 A | 11/1997 | Buluschek | |
| 5,804,222 A | 9/1998 | Brown et al. | |
| 6,261,081 B1 | 7/2001 | Speck et al. | |
| 6,537,471 B2 * | 3/2003 | Swanson | B29C 48/91 264/40.6 |
| 6,814,557 B1 * | 11/2004 | Swanson | B29C 48/10 425/140 |
| 7,329,113 B2 | 2/2008 | Leseman | |
| 8,038,430 B2 * | 10/2011 | Swanson | B29C 48/34 425/378.1 |
| 8,147,739 B2 * | 4/2012 | Castiglioni | B29C 48/34 264/171.13 |
| 8,535,033 B2 * | 9/2013 | Castiglioni | B29C 48/92 425/97 |
| 8,585,949 B2 * | 11/2013 | Ponta | B29C 48/92 264/176.1 |
| 9,120,262 B2 * | 9/2015 | Ponta | B29C 48/255 |
| 2002/0025127 A1 * | 2/2002 | Graham | G02B 6/443 385/102 |
| 2002/0158357 A1 * | 10/2002 | Swanson | B29C 48/06 264/40.1 |
| 2004/0074554 A1 | 4/2004 | Starita | |
| 2004/0159964 A1 * | 8/2004 | Lavoie | B32B 37/153 264/40.1 |
| 2009/0174103 A1 * | 7/2009 | Ponta | B29D 30/08 264/40.3 |
| 2009/0206509 A1 * | 8/2009 | Castiglioni | B29C 48/92 264/171.13 |
| 2010/0266749 A1 * | 10/2010 | Swanson | B29C 48/79 427/10 |
| 2012/0015097 A1 * | 1/2012 | Swandon | B29C 48/325 427/8 |
| 2012/0177765 A1 * | 7/2012 | Castiglioni | B29C 48/92 425/145 |
| 2014/0042663 A1 * | 2/2014 | Ponta | B29C 48/325 264/210.1 |
| 2015/0231843 A9 * | 8/2015 | Ponta | B29C 48/92 264/210.1 |

FOREIGN PATENT DOCUMENTS

| | | |
|---|---|---|
| CN | 206703469 U | 12/2017 |
| JP | 2004284229 A | 10/2004 |

OTHER PUBLICATIONS

International Search Report and Written Opinion of related international application PCT/US19/053954 issued by KIPO dated Jan. 29, 2020.

* cited by examiner

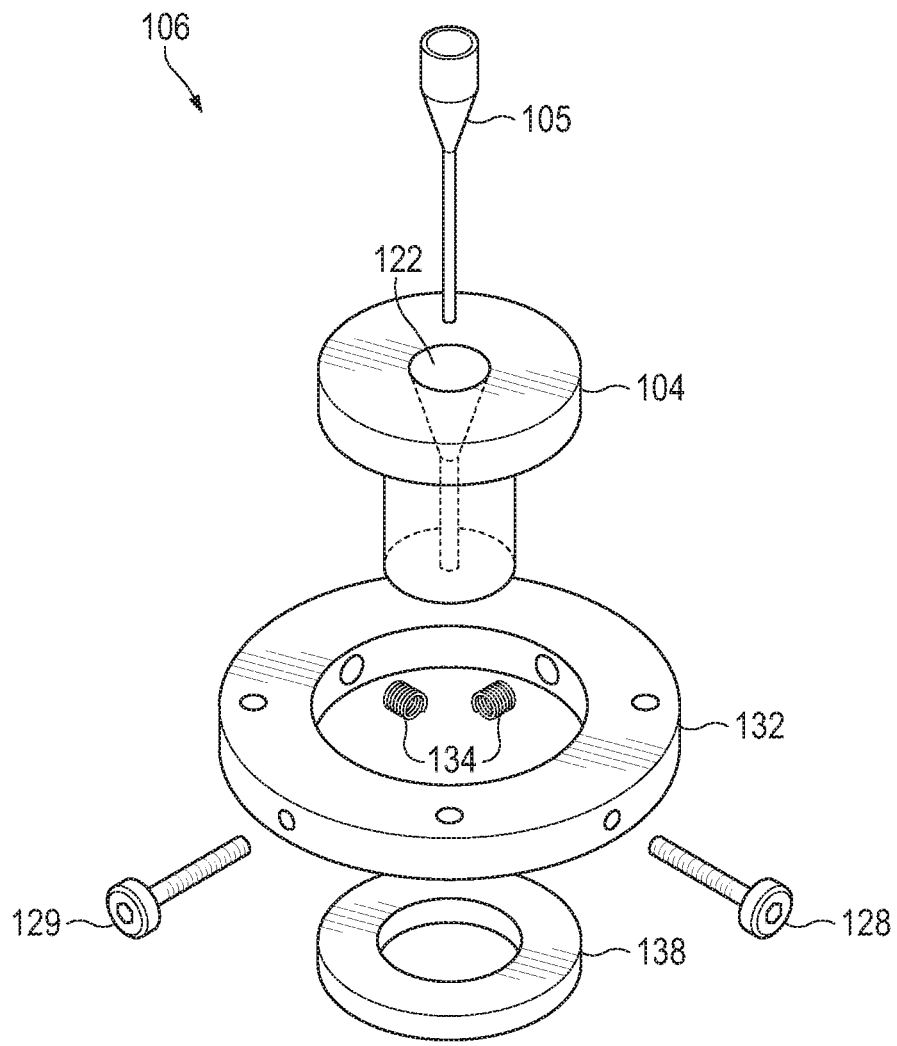
FIG. 3
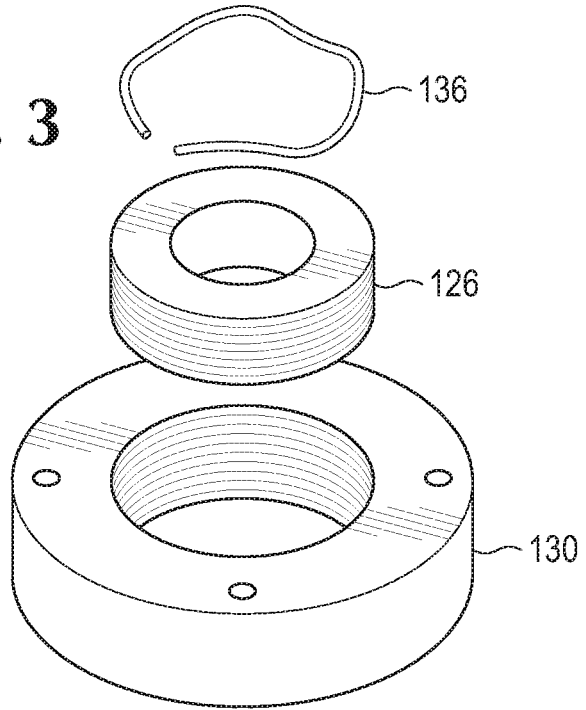

METHOD OF ADJUSTING A CROSSHEAD EXTRUDER DIE RETAINING ASSEMBLY

FIELD OF INVENTION

The present invention is generally directed to an extrusion head assembly and method, particularly, to an assembly and method that allows for adjustment of the alignment of the extrusion die.

BACKGROUND

Extrusion is a manufacturing process used to create objects having a fixed cross-sectional profile. At its most basic form, extrusion is defined as pushing a material, such as plastic, through a die to produce an object such as pipe. In another form of extrusion, co-extrusion, a linear substrate (often a wire) is drawn through the die as polymeric material is extruded about the substrate, creating a coated substrate, which is often an insulated wire. Over the past fifty years, there has been an increasing demand for insulated wires, and other extruded forms, having smaller and smaller diameters, creating a demand for very precise extrusion equipment. Commercial manufacturing extruders have evolved into complex machines that utilize extreme pressure, and often heat, to force an extrudate through a die, about a linear substrate, such as a wire, that is being drawn through the die.

The die must be secured to the extruder with enough force to withstand the pressure being applied to the extrudate. In a best-case scenario, if the face of the die is not properly secured to the extruder, die lip buildup or "die drool" can accumulate on the die. Such accumulation results not only in a loss of raw material, but also costly periodic shutdowns of the processing line in order to clean the die and prevent the material from interfering with the extrusion. In a worst-case scenario, an unsecured die can present a safety hazard to operators as molten material is ejected.

Securement of the die is generally accomplished by bolting a die retaining assembly, which holds the die in place, to the face of the extruder. Unfortunately, differential pressures from the extrudate pressing against the die rear surface can cause the die to move out of alignment as the machine is run. The restocking of a co-extruded material, may cause this type of differential pressure. Adjustment bolts projecting from the side of an element of the retaining assembly can be rotated to push the die. But operators must release some of the pressure holding the die in place, in order to move the die. This requires loosening a set of bolts that retain a collar that presses the die into the extruder front face. In order to avoid a costly shutdown of the extruder, this must be done while the extruder is running. Moreover, although the operator may spend a fair amount of time slightly loosening one bolt, and the others in sequence, it is impossible to loosen these bolts perfectly simultaneously, resulting in uneven pressure against the die by the collar as the loosening process progresses. As the bolts are loosened there is a sharp drop in pressure holding the die in place. All of these factors can endanger the quality of the extrusion produced during the adjustment process, and in the worst-case result in a shutdown, caused, for example, by polymerization of extrudate in the die. What is needed, but not yet available, is an apparatus for permitting die position adjustment, as an extruder is operating, while maintaining a moderately lessened level of circumferentially even pressure against the die.

SUMMARY

One aspect of the novel concepts presented herein is an extruder having an extruder crosshead, a die, and a die retaining assembly. The extruder crosshead has an annular major surface while the die has a first die surface facing and conformal to that major surface. The die also has a second die surface substantially opposed to the first die surface. Meanwhile, the die-retaining assembly is attached to the extruder crosshead, evenly and variably pressing the second die surface with controlled pressure such that the substantially opposing first die surface is pressed into the major surface of the extruder crosshead. The die-retaining assembly also includes movable elements which abut the die in order to move the die. The configuration of the die-retaining assembly can be used to evenly reduce the pressure exerted by over the second die surface so that the movable elements can be used to adjust the position of the die, while minimizing the possibility that the die will shift, relative to the crosshead, permitting extrudate to escape.

In at least one related embodiment, a method of adjusting an extruder die's position includes providing an extruder having an extruder crosshead with a major surface and die having a first die surface facing and conformal to that major surface. The die also has a second die surface substantially opposed to the first die surface. The provided extruder also includes a die-retaining assembly attached to the extruder crosshead and evenly and variably pressing the second die surface with a controllable pressure, such that the first die surface is pressed into the extruder crosshead major surface. The die-retaining assembly also includes movable elements abutting the die in order to move the die. The method of adjusting the extruder die thus further includes reducing the controllable pressure exerted by the die-retaining assembly on the second die surface while maintaining an even pressure over the second die surface. The method further comprises using the movable elements to move the die.

In another related embodiment, an adjustable die extruder head assembly is presented for adjustably securing a die to the downstream end of an extruder crosshead. The adjustable die extruder head assembly comprises a main body secured to the extruder crosshead, a pressure applicator adjustably secured within a channel of the main body, and an axial adjuster positioned about the die housing a plurality of adjustment members. The pressure applicator has a diameter equal to or less than the main body channel diameter so that it can be adjustably secured within the channel. There, the pressure applicator evenly presses the die into the extruder crosshead with a pressure corresponding to its adjustable securement to the main body such that decreasing the pressure exerted on the die decreases the minimum amount of force required to change the position of the die. The axial adjuster has a sidewall defining an inner channel that is positioned about the die such that the adjustment members housed within the axial adjuster contact the die so that adjustment of an adjustment member causes a corresponding change in a force applied to the die, and whereby adjustment of the die position results when the change in force is greater than the minimal amount of force required to change the position of the die.

BRIEF DESCRIPTION OF THE DRAWINGS

FIG. 3 is an exploded isometric view of the extruder head assembly of FIG. 1.

DETAILED DESCRIPTION AND PREFERRED EMBODIMENT

Figure 1:
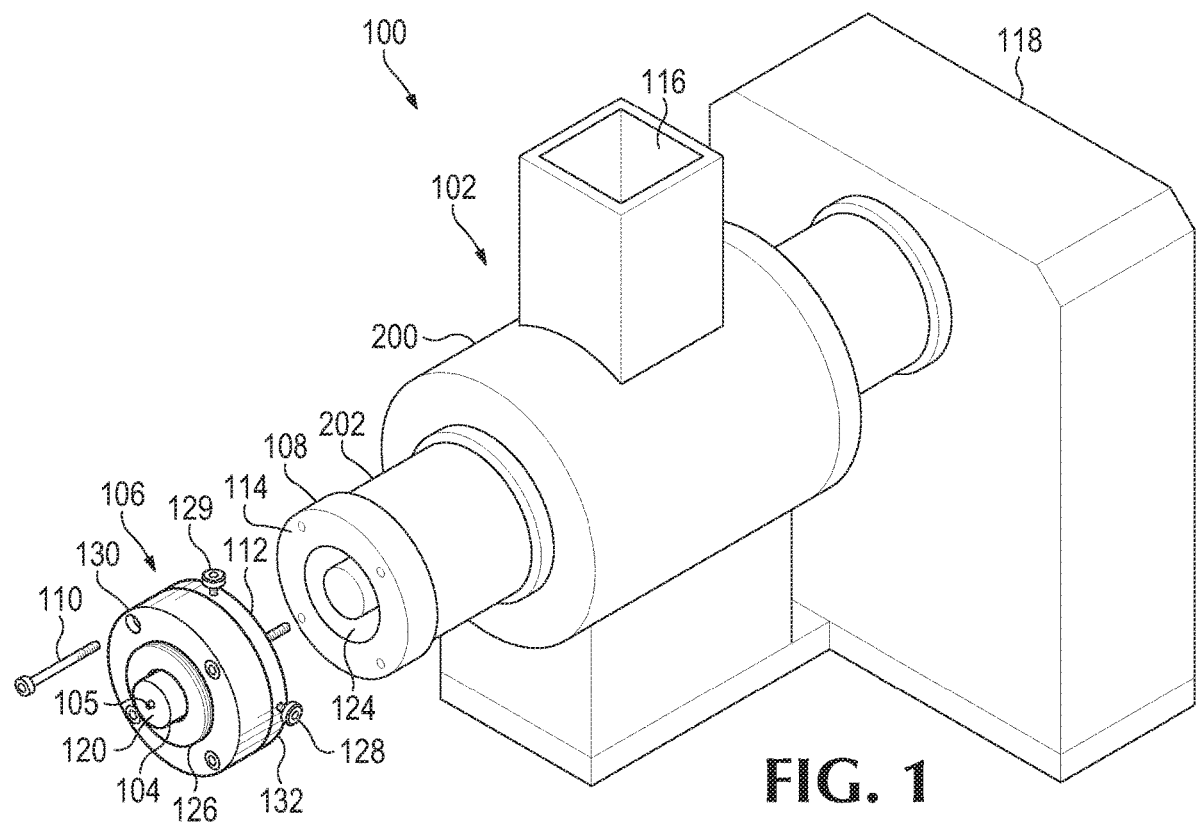
FIG. 1 is a partially exploded, simplified perspective view depicting an extruder with an embodiment of an extruder head assembly according to the present invention.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description, with reference to the accompanying drawings, in order to provide a thorough understanding of the invention. However, the invention may be practiced according to the claims without some or all these specific details. For clarity, technical material that is known in the technical fields related to the invention has not been described in detail so that the invention is not unnecessarily obscured. In the drawings, similar elements have similar reference numerals.

To assist the description of the scope and its components the coordinate terms "upstream," "downstream," "longitudinal axis," and "lateral" are used to describe the disclosed embodiments. The terms are used consistently with the description of the exemplary applications and are in reference to the stream of extrudate produced by the extruder during operation. In other words, upstream components are nearer to the extruder crosshead than downstream components, with the longitudinal axis being generally defined as the center of the path the extrudate follows from upstream to downstream. "Lateral" describes components or movement to the side, at approximately a ninety-degree angle, from the longitudinal axis.

1. DEFINITIONS

When the term "metal" is used as a modifier in this application, it means that the item that is the object of the modifier is largely metal but could include other materials as well.

As used herein, the terms "passage," "channel," "duct," and "conduit" are used throughout the application and each should be taken to mean a channel for conveying a substance, especially a fluid. Although each term carries the same meaning in the application at hand, they should not be considered to be completely interchangeable, as for ease of discussion, each term's use has been limited to particular channels of the assembly.

As used herein, the term "annular" describes an object (i.e. an "annulus"), structure, or region having a cross-section with a hole. The cross-section may take any shape including circular (standard) or square, so long as it has a hole. Examples include rings, washers, and square annuli (i.e. objects with a substantially square cross-section having a hole).

When the term "spring" is used in this application, it refers to a resilient mechanical device that can be pressed or pulled but returns to its former shape upon release, used chiefly to exert constant tension or absorb movement. The term "spring" includes devices made of any material, but especially metal, plastic, or composite. Examples include compression springs, torsion springs, coil springs, flat springs, wave springs, wire springs, serpentine springs, helical springs, volute springs, composite or plastic molded springs, and more.

2. OPERATING ENVIRONMENT AND METHOD OF USE

The present invention is generally directed to an extruder assembly, an adjustable die retaining assembly, and a method of using the same. FIG. 1 illustrates a partially exploded, simplified perspective view of an extruder assembly 100 according to the present invention. Extruder assembly 100 further comprises an extruder 102 with a die 104, hosting a linear substrate guide or "tip" 105, and a die retaining assembly 106.

The die retaining assembly 106 is attached to extruder crosshead 108, with bolts 110, such that the upstream end or face 112 of the die retaining assembly 106 abuts the downstream end or face 114 of the extruder crosshead 108.

Figure 2:
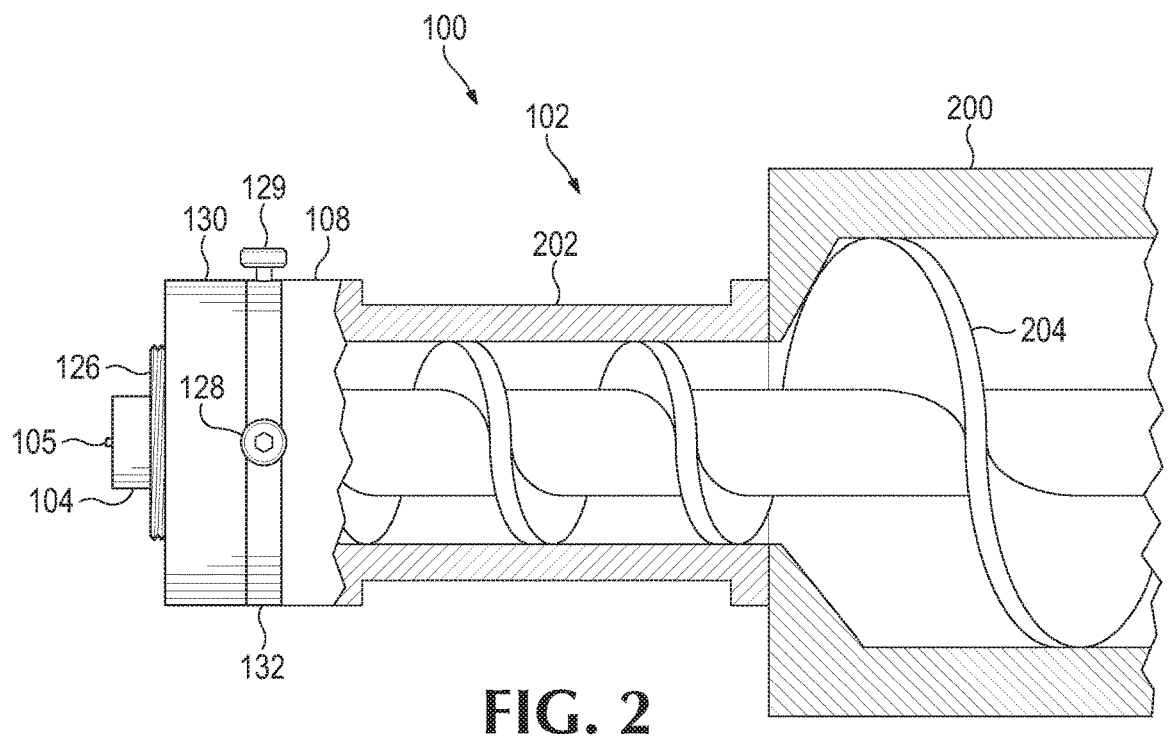
FIG. 2 is a simplified partial cross-sectional side view of the feed and compression sections of the extruder and extruder head assembly of FIG. 1.
Figure 4:
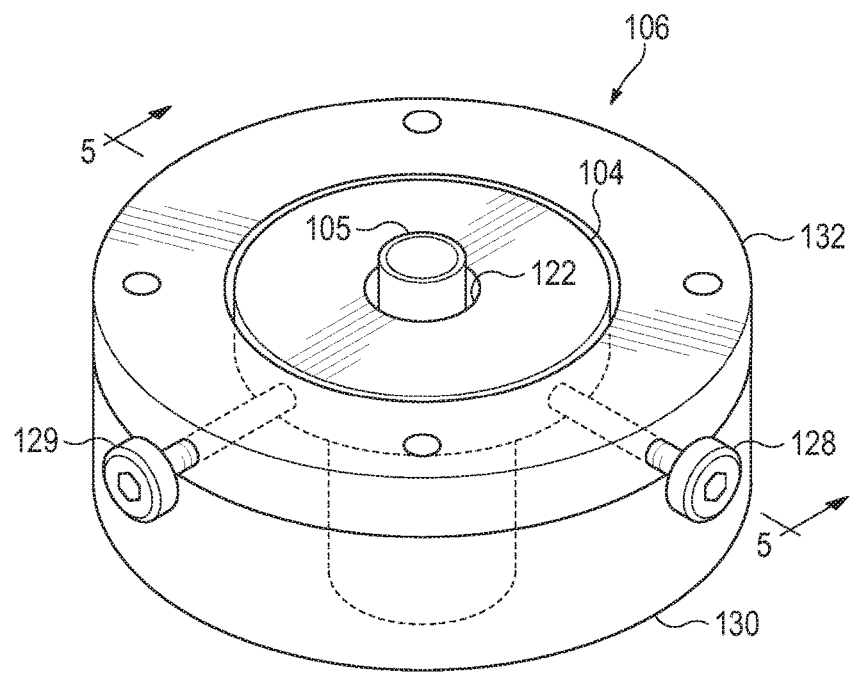
FIG. 4 is an isometric view of the extruder head assembly of FIG. 3, with obscured portions of both the die and adjustment members shown in dashed line.

FIG. 2 is a simplified partial cross-sectional side view of the die retaining assembly 106 as well as feed section 200 and compression section 202 of extruder 102 of FIG. 1. Feed section 200 and compression section 202 each house a portion of rotatable screw 204. In some embodiments related to co-extrusion, rotatable screw 204 also defines a lengthwise interior lumen, permitting linear substrate to pass through. During operation of extruder assembly 100, and referring to both FIGS. 1 and 2, substrate is added to feed section 200 via feed inlet 116. Screw 204 is rotated by a drive means housed at 118, forcing extrudate through feed section 200 to compression section 202, before passing through extruder crosshead 108. From extruder crosshead 108, the melted extrudate passes through the die 104 before being extruded out downstream end 120 of die extruder head 114. In embodiments related to co-extrusion, the extrudate will be extruded about a linear substrate (not shown), typically a wire.

To adjust the lateral position of die 104 relative to the longitudinal axis and improve the alignment of passage 122 with channel 124 of extruder crosshead 108, pressure applicator 126 is loosened to decrease the pressure on die 104. Once the pressure holding the die 104 against face 114 has been reduced, the lateral position of die 104 may be more easily—that is with less force—and finely adjusted through use of thumb screws 128 and 129, which may be loosened or tightened to laterally adjust the position of die 104. Adjustment of thumbscrew 129 will result in a vertical adjustment, while adjustment of thumbscrew 128 will result in a horizontal adjustment of die 104. In further embodiments, additional axes of the die position may be adjusted in similar manner.

3. ADJUSTABLE DIE RETAINING ASSEMBLY

FIGS. 3, 4, 5, 6, and 7 provide various views of one embodiment of an adjustable die retaining assembly 106. A linear substrate guide 105 accepts a linear substrate, such as a wire, at its proximal end (top in FIG. 5) and it exits at distal end and is coated with polymer that is extruded between the inner wall of die 104 and the linear substrate guide 105. Die retaining assembly 106 retains die 104 having an inner passage 122 for the flow of extrudate. The assembly 106 includes a main body 130 which is bolted to the crosshead 104, pressure applicator 126 which is held in threaded engagement with main body 130. A die position adjuster 132, hosting, in threaded holes, adjustment bolts 128 and 129, which are opposed by springs 134. In an alternative preferred embodiment, springs 134 are replaced with two additional adjustment bolts, which may be identical to and oppose bolts 128 and 129. In some instances, the force of springs 134 may not be great enough to move die 104 when, for example, bolt 129 is screwed out, but an opposing bolt would be able apply sufficient force to move die 104 in the direction that bolt 129 had been withdrawn.

Figure 5:
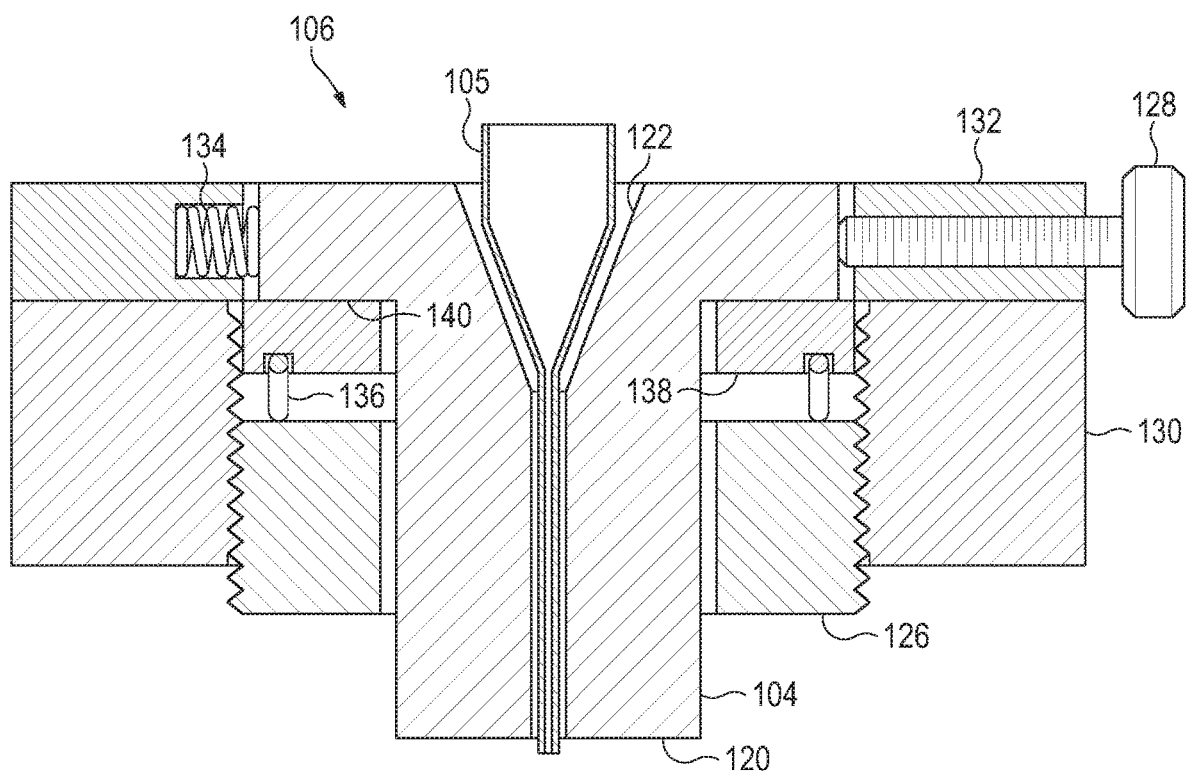
FIG. 5 is a cross-sectional view of the extruder head assembly of FIGS. 3.
Figure 6:
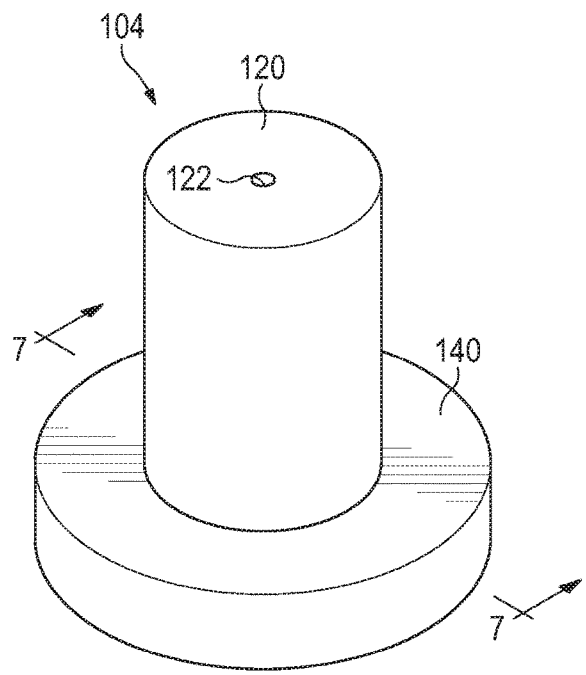
FIGS. 6 and 7 are an isometric and cross-sectional view along line 7-7, respectively, of an embodiment of a die.
Figure 7:
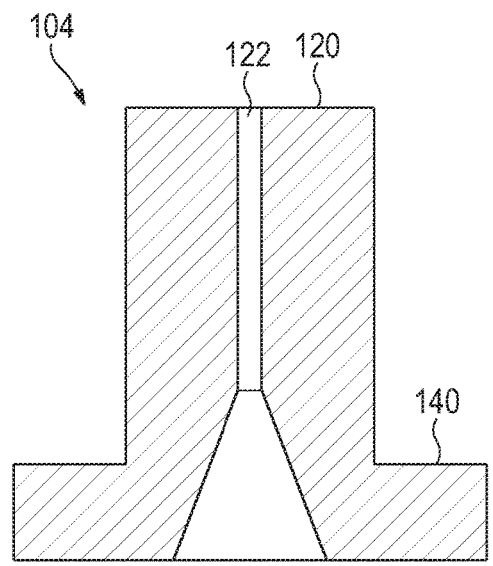

As shown at FIG. 5, during operation of extruder 102, adjustment members 128 and 129 laterally contact the external sidewall of die 104. Together with opposing springs 134, the adjustment members evenly and controllably define the substantially lateral position of inner passage 122. An additional pressure modulator, wave spring 136 (shown in schematic form, other forms of wave springs being used in various embodiments), with annular disk 138, help to ensure the even application of pressure against downstream face 140 (See FIGS. 6 and 7) of die 104. Wave spring 136 and annular disk 138 also provide for a gradual and continuous decrease in pressure as pressure applicator 126 is loosened, as will be explained further below. In further preferred embodiments, contemplated herein, the die is rotated or moved into better perpendicular directionality, relative to the surface of the extruder.

4. METHOD OF USE

There are various situations in which it is desirable to adjust the position of die 104 as the extruder assembly 100 is operating. In the case of a co-extruder used to extrude a coating on a linear substrate, the axis of the linear substrate outlet may need to be brought into alignment with the axis of extrudate channel 122 to assure an even coating on the substrate around its circumference, so that one side of the substrate does not have a thicker coating than the other.

To adjust the lateral position of die 104 relative to the longitudinal axis and improve the alignment of passage 122 with channel 124 of extruder crosshead 108 (See FIG. 1), pressure applicator 126 is loosened (by rotation), thereby relieving pressure on spring 130, which relieves pressure on annular disk 138, and in turn on die 104, which is then held less tightly between disk 138 and the crosshead face 114. At this point the die 104 may be more easily moved by screws 128 and 129. Moreover, during the process of loosening the pressure applicator 126, it is kept entirely level with respect to wave spring 136, so that annular disk 138 applies even pressure to die 104, making it far less likely that extrudate will be permitted to escape. Moreover, the process of loosening the pressure on die 104 is made far easier than in the prior art, as only one item needs to be loosened, rather than a collection of fasteners. In other embodiments, further axes of the die position are subject to adjustment, by similar means.

Figure 8:
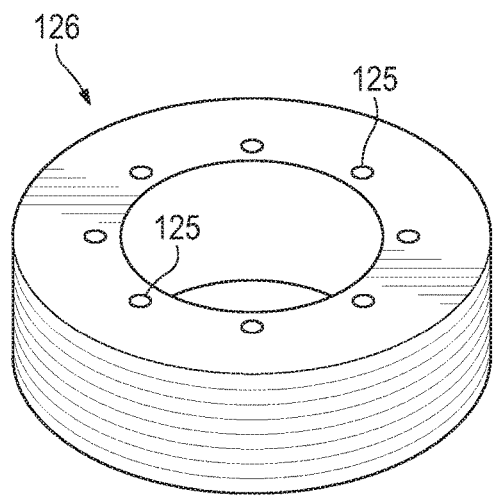
FIG. 8 is an isometric view of the pressure applicator of FIG. 3, with the downstream end facing up.

Referring to FIG. 8, pressure applicator 126 may be adjustably attached to main body 130 in any suitable fashion. Here, as previously explained, pressure applicator 126 is in threaded engagement with main body 130. Thus, the loosening of pressure applicator 126 is accomplished by rotating the applicator to unthread it from the main body. The loosening may be accomplished manually using, for example, a spanner wrench with prongs that fit into an opposed pair of engagement holes 125.

Figure 18:
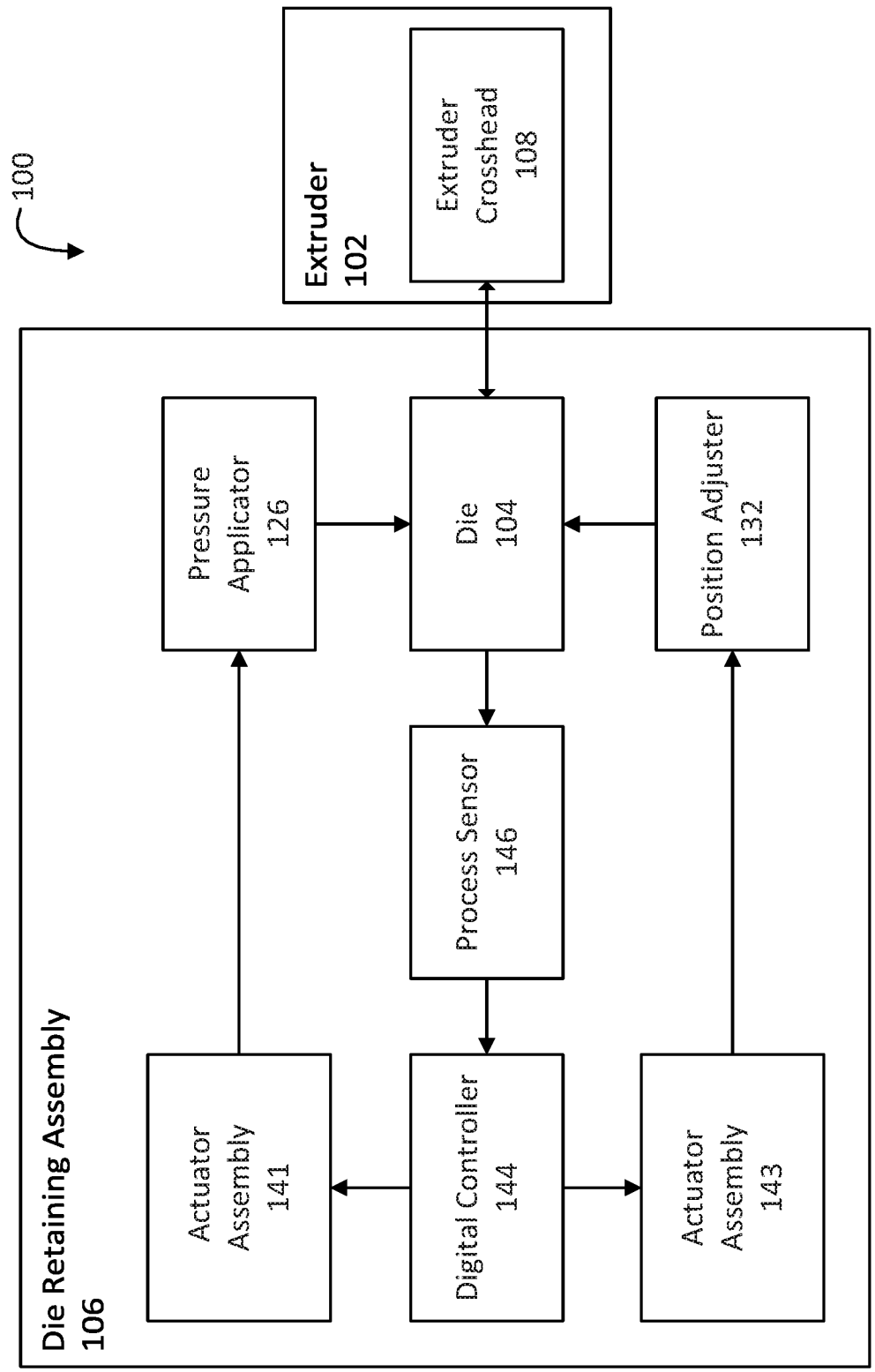
FIG. 18 is a block diagram depicting an alternate configuration an adjustable die retaining assembly including an actuator.

In another embodiment, adjustment to pressure applicator 126 is controlled or powered by a pneumatic actuator system, as shown at FIG. 18. A rotating actuator may control the threaded engagement of applicator 126 with main body 130. Alternatively, where applicator 126 is not in threaded engagement with main body 130, a linear pneumatic actuator may control the pressure applied by applicator 126 directly by pressing on the applicator's downstream face. The actuator may be controlled directly by an operator, indirectly by an operator sending command signals through a computer.

In another alternative embodiment—and referring to FIGS. 9, 12, and 13 (described in greater detail, below) which collectively describe an alternate embodiment—adjustment of pressure applicator 126' may be controlled by a worm drive 133 housed in main die 130' at through-hole 131, the worm drive interfacing with applicator 126' at teeth 127. As with the pneumatic actuator, the worm drive may be manually controlled by an extruder operator directly, indirectly through operation of a computer, via a servo, automatically by a computer running a software application, or some combination the above.

Adjustments to adjustment members 128 and 129 and the lateral position of die 104 may be similarly controlled: manually, indirectly or directly, and automatically by a computer.

Exemplary Alternative Embodiments

Figure 9:
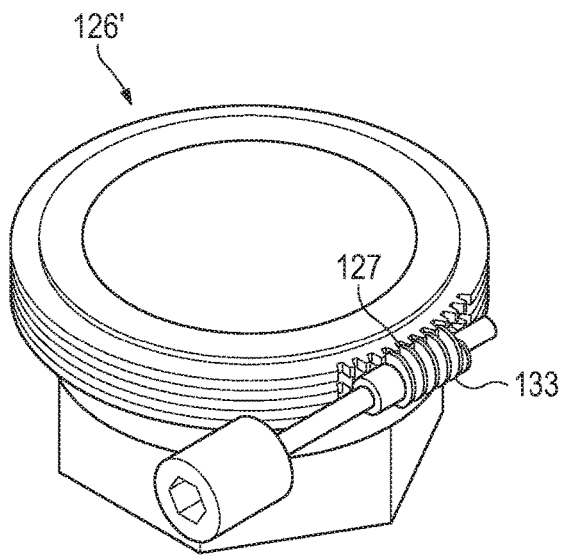
FIG. 9 is an isometric view of an alternative embodiment of a pressure applicator with the upstream end facing up.
Figure 10:
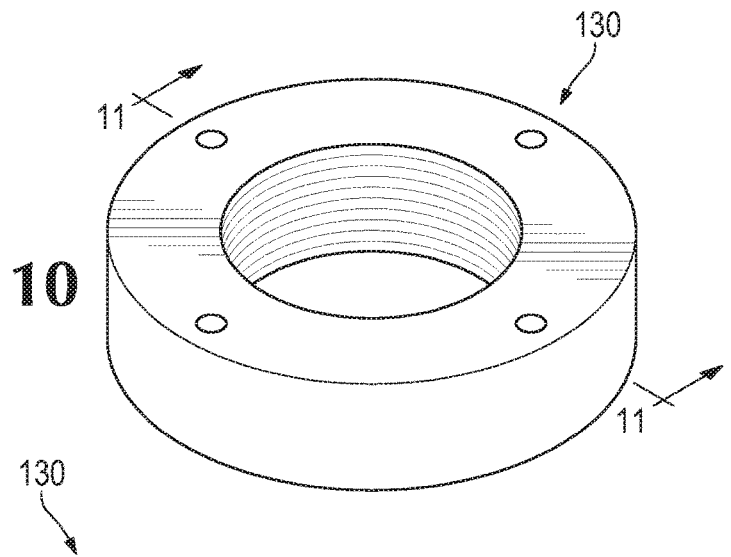
FIGS. 10 and 11 are an isometric and cross-sectional view as viewed along lines 11-11, respectively, of the die adjuster main body of FIG. 3.
Figure 11:
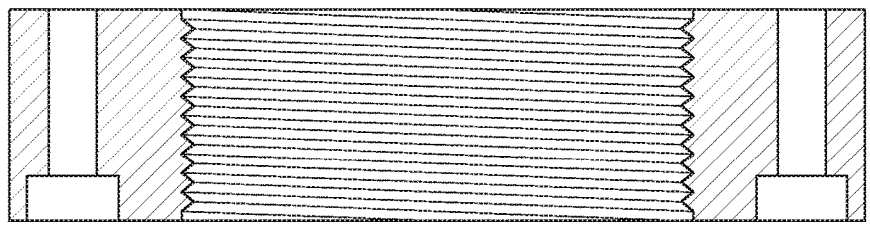
Figure 12:
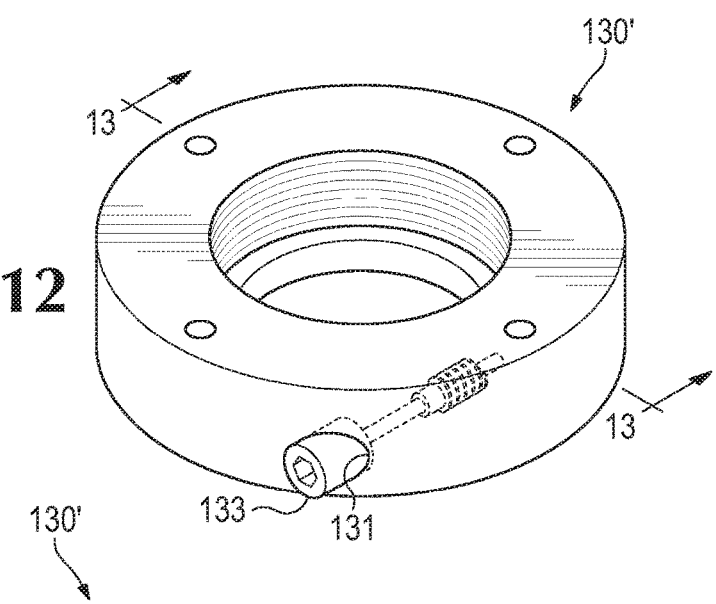
FIGS. 12 and 13 are an isometric and cross-sectional view as viewed along lines 13-13, respectively, of an alternate embodiment of a die adjuster main body.
Figure 13:
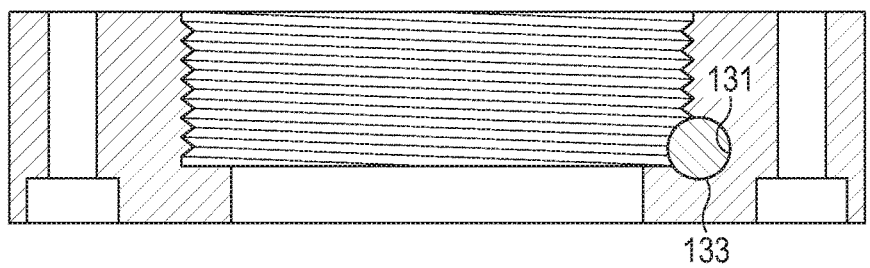
Figure 14:
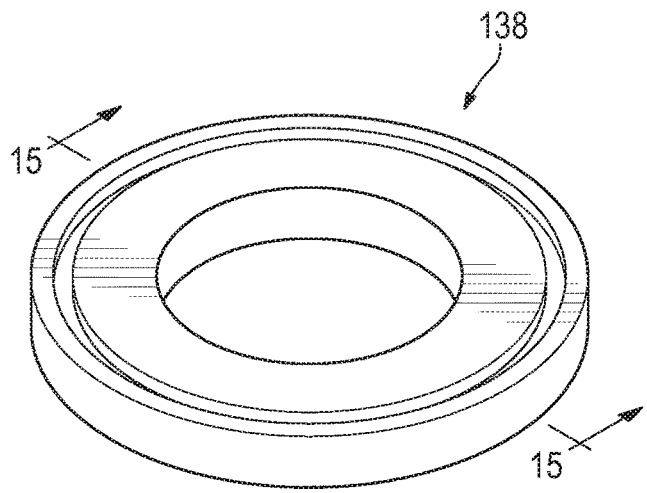
FIGS. 14 and 15 are an isometric and cross-sectional view as viewed along lines 15-15, respectively, of the floating member of FIG. 3.
Figure 15:
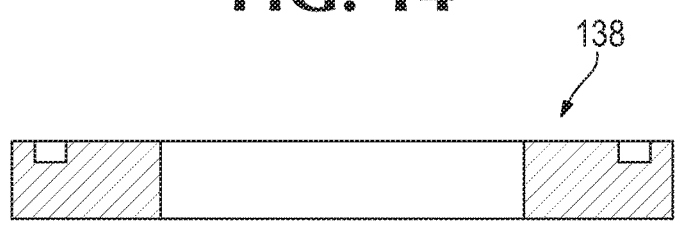
Figure 16:
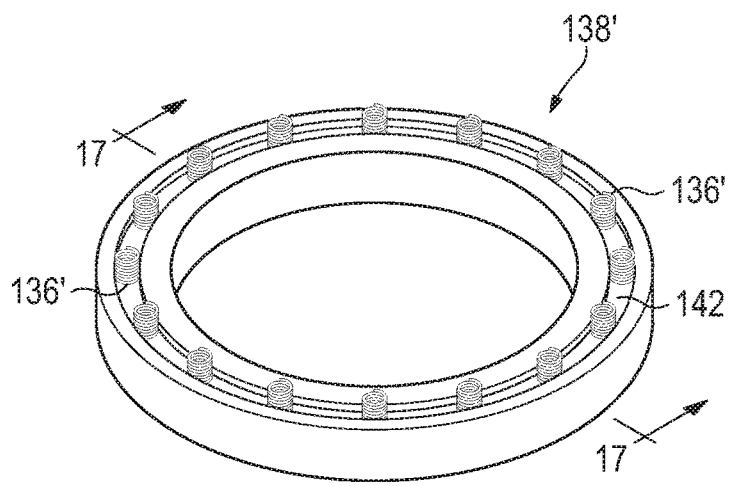
FIGS. 16 and 17 are an isometric, and cross-sectional view as viewed along lines 17-17, respectively, of an alternate embodiment of a combined floating disk-pressure modulator.
Figure 17:
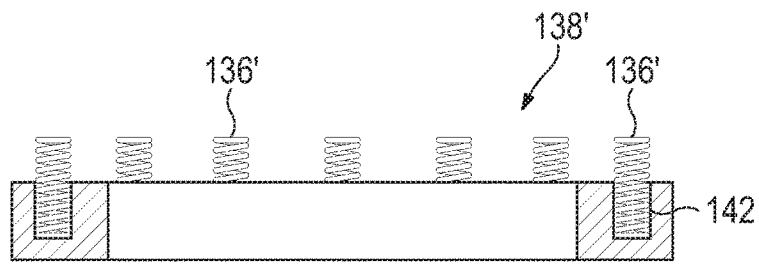

Referring to FIGS. 9, 12 and 13, which collectively describe an alternate embodiment, teeth 127 formed in the threads of pressure applicator 126' permit engagement by a threaded bolt portion or worm drive (not shown), that is engaged in through-hole 131 in main body 130'. Accordingly, rotating the bolt in through-hole 131 will cause pressure applicator 126' to rotate in a finely controlled manner, thereby relieving pressure on die 104 just enough to permit adjustment, but not so much as to permit extrudate to escape.

In further embodiments, and referring to FIGS. 14-17, annular disk 138 may take may various forms. In one embodiment (not shown) the sides of disk 138 are cut, squaring the circle, to assist with adjustment of the die 104. In another embodiment (not shown), disk 138 fits over die 104 by conforming to the die's entire downstream face and taking the form a cap. In yet another embodiment, shown at FIGS. 16 and 17, the floating annular disk is combined with springs 136' housed within a groove 142 on the upstream face of disk 138'.

In a further alternate embodiment, as outlined in the block diagram of FIG. 18, an extruder assembly 100, includes a die retaining assembly 106 that has an actuator assembly 141, which is used to evenly apply pressure to wave spring 136, directly to disk 138 or directly to die 104. In one embodiment, assembly 141 is a fluid pressure system, such as a pneumatic or hydraulic system. In this case, the pressure applied is naturally balanced because it matches the fluid pressure of the pneumatic or hydraulic system. Also, in an alternate embodiment, thumb screws 128 and 129 are turned by an electric motor. In yet another alternative, screws 128 and 129 are replaced by a direct actuation mechanism, such as a fluid pressure actuator that may be controlled by a computerized control mechanism.

The pressure applied by the actuators is responsive to a signal received by digital controller 144. For example, a video camera or other sensor 146 is focused on the output of die 104 and a computer algorithm, which in an embodiment includes artificial intelligence, automatically controls actuator assemblies 141 and 143 to affect an automatic adjustment of position adjuster 132, when needed, by reducing the pressure applied by the fluid pressure actuator. Digital controller 144 sends a signal to assembly 141 to reduce the pressure applied by pressure applicator 126 so that the lateral position of die 104 may be adjusted relative to extruder crosshead 108. Once the pressure applied by pressure applicator 126 has been reduced, assembly 143 adjusts the lateral position of die 104 via position adjuster 132. Digital controller 144 sends these signals responsive to either data received by process sensor 146 or an input from an operator (not shown), and in accordance with instructions stored in a non-transitory memory (not shown), indicating the need for an adjustment to die 104. Process Sensor 146 may be any type of sensor, such as a camera, for monitoring the position of die 104, the flow of extrudate through the die, or both. Actuator assemblies 141 and 143 may drive a rotating head—to control, for example, the threading of pressure applicator 126 or linear adjustment members 128 and 129—or linear, for directly applying pressure. Process sensor may be a 3-axis, 4-axis vision system, an x-ray system, an ultrasound system, or any other system that can sense the concentricity of the extrudate.

In embodiments sensing and control is performed in an arbitrary number of degrees of freedom, for example rotational and longitudinal combinations of axes, to different parts of the tool head. In a preferred embodiment a die retaining assembly 106 is configured to effect the coextrusion of three wires, the first two of which must be covered with a minimum layer of extrudate and wherein the third wire must have a consistent capacitance relationship with the first two, but having an arbitrary position within the extrudate, so long as it is covered. A sensor suite includes several cameras to monitor the first two wires and maintain their position within the extrudate, and also includes two capacitance sensors, with one of them connected between the third wire and each of the first two wires. In operation, the actuators automatically adjust the first two wires, positionally, and adjust the third wire relative to the other two. In this example, concentricity is unnecessary for any wire, so long as the wires are all coated with extrudate. The third wire may wander within the extrudate, so long as it not bare of extrudate anywhere. Skilled persons will recognize that the above example may require a complex suite of actuators, with the tip for the third wire moved in two lateral axes, with actuation in a rotational axis or two also possibly being necessary, as the third wire may be flat, so that orientation could be critical. Also, the first two wires each would require actuation in at least two lateral dimensions.

In another extruder configuration, a helical wire or wires may be set about a center wire or wires. In this configuration, each spiral tip (wire guide) must be continuously adjusted in two lateral axes and two rotational axes, to maintain the correct spiral angle and wrap-spacing about the central wire(s).

5. CONCLUSION

The disclosed embodiments are illustrative, not restrictive. While specific configurations of the extruder die assembly have been described, it is understood that the present invention can be applied to a wide variety of die assemblies. There are many alternative ways of implementing the invention, the common thread being the even and gradual reduction of the pressure holding the die in place, so that position adjustments can more easily be made.

The invention claimed is:

1. A method of adjusting an extruder die position, in need of adjustment, comprising: providing an extruder having: an extruder crosshead having a major surface; a die, having a first die surface facing and conformal to said extruder crosshead major surface and a second die surface substantially opposed to said first die surface; and a die-retaining assembly attached to said extruder crosshead and pressing said second die surface with an even and variable and controllable pressure, so that said first die surface is pressed into said extruder crosshead major surface, and including moveable elements, abutting said die, to move said die; reducing said pressure, while maintaining even pressure over said second die surface; and after reducing said pressure and while maintaining said reduced and even pressure over said second die surface, using said moveable elements to move said die; and wherein said die-retaining element includes a main body, a pressure applicator and a spring assembly, said main body fastened to said crosshead, and wherein said pressure applicator is anchored in said main body and presses against said spring assembly, which in turn applies pressure to said second die surface.

2. The method of claim 1, wherein said spring assembly is a wave spring to achieve said even application of pressure.

3. The method of claim 1, wherein said spring assembly includes a set of springs to achieve said even application of pressure.

4. The method of claim 1, wherein said die-retaining assembly further includes an annular disk interposed between said spring assembly and said second die surface and wherein said spring assembly applies pressure to said second die surface by pressing against said annular disk which, in turn, presses against said second die surface.

5. The method of claim 1, wherein said pressure applicator is hosted in threaded engagement to said main body, and reducing said pressure comprises rotating said pressure applicator in a first direction to reduce said threaded engagement.

6. The method of claim 5, wherein said die-retaining assembly further comprises means to automatically rotate said pressure applicator.

7. The method of claim 5, wherein said extruder is a co-extruder, said die has a first axis and houses an inner die having a second axis, and wherein using said moveable elements to move said die changes the position of said first axis relative to said second axis of said second die member, thereby adjusting the coaxiality of said die and said inner die.

8. The method of claim 5, wherein said extruder further comprises a servo and wherein using said moveable elements is controlled by said servo responsive to receiving a signal from a computer, and wherein said servo is responsive to a sensor focused on output of said die.

9. The method of claim 8, wherein said sensor is a video camera.

10. The method of claim 5, further comprising rotating said pressure applicator in a second direction to increase said threaded engagement between said pressure applicator and said main body.

11. The method of claim 10, wherein said pressure applicator is manually rotated using a tool.

* * * * *